(12) United States Patent  
Mattern et al.

(10) Patent No.: US 11,887,408 B2
(45) Date of Patent: Jan. 30, 2024

(54) SERVICE EVENT RESPONSE TAILORING (71) Applicant: Cummins Inc., Columbus, IN (US)

(72) Inventors: Michael F. Mattern, Columbus, IN (US); Gorance V. Eftimovski, Columbus, IN (US); Steven R. Collins, Columbus, IN (US); Prasanna Srinivasan, Columbus, IN (US); Tomas Lopez Lauterio, Columbus, IN (US); Joshua A. Parton, Columbus, IN (US)

(73) Assignee: Cummins Inc., Columbus, IN (US)

( * ) Notice: Subject to any disclaimer, the term of this patent is extended or adjusted under 35 U.S.C. 154(b) by 30 days.

(21) Appl. No.: 17/562,657

(22) Filed: Dec. 27, 2021

(65) Prior Publication Data

US 2022/0122382 A1 Apr. 21, 2022

Related U.S. Application Data (63) Continuation of application No. 16/349,793, filed as application No. PCT/US2016/062909 on Nov. 18, 2016, now Pat. No. 11,210,868.

(51) Int. Cl.
*G07C 5/00* (2006.01)
*G05B 23/02* (2006.01)
*G06F 13/24* (2006.01)
*G07C 5/08* (2006.01)

(52) U.S. Cl.
CPC .......... *G07C 5/006* (2013.01); *G05B 23/0259* (2013.01); *G06F 13/24* (2013.01); *G07C 5/0808* (2013.01)

(58) Field of Classification Search
None
See application file for complete search history.

(56) References Cited

U.S. PATENT DOCUMENTS

| 10,106,175 | B1 | 10/2018 | Shirchenko et al. |
| 2007/0279283 | A1 | 12/2007 | Flick |
| 2010/0082199 | A1 | 4/2010 | Ito |
| 2010/0324777 | A1 | 12/2010 | Tominaga et al. |
| 2014/0188999 | A1 | 7/2014 | Leonard et al. |
| 2016/0197932 | A1 | 7/2016 | Hoffman et al. |

OTHER PUBLICATIONS

International Search Report and Written Opinion for International Application No. PCT/US2016/062909, dated Feb. 2, 2017, 10 pages.

*Primary Examiner* — Abdhesh K Jha
(74) *Attorney, Agent, or Firm* — FOLEY & LARDNER LLP (57) ABSTRACT

Systems, apparatuses, and methods disclosed provide for tailoring responses to fault data generated during a service event. A method includes determining that a service event for a vehicle has started based on an indication from an off-board diagnostic service tool, interrupting transmission of a fault message during a time period after the service event for the vehicle has started and before the service event for the vehicle has ended, and determining that the service event for the vehicle has ended.

14 Claims, 4 Drawing Sheets

| P | R | D P | PF | PS | Source Address | Data Field |
|---|---|-----|----|----|----------------|------------|
| 3 | 1 | 1   | 8  | 8  | 8              | 0-64       |

J1939 PDU

SERVICE EVENT RESPONSE TAILORING

CROSS-REFERENCE TO RELATED PATENT APPLICATIONS

This application is a continuation of U.S. patent application Ser. No. 16/349,793 titled "Service Event Response Tailoring," filed May 14, 2019, which is a U.S. national phase application of International Application No. PCT/US2016/062909, titled "Service Event Response Tailoring," filed Nov. 18, 2016, both of which are incorporated herein by reference in their entireties and for all purposes.

TECHNICAL FIELD

The present disclosure relates to systems and methods for tailoring responses of telematics system to fault information during service events.

BACKGROUND

In general, telematics is the convergence of telecommunications and information processing, which involves sending, receiving, and processing information via telecommunication devices. Telematics systems have been widely used in various vehicular applications. For example, an onboard telematics device (e.g., telematics box) can provide fault information obtained onboard to a remote telematics server through wireless connections. The server can immediately diagnose the fault and provide actionable information (e.g., fault alert) to the user instantly. Improvement of responses of telematics systems to fault information is generally desired.

SUMMARY

One embodiment relates to an apparatus. The apparatus comprise a fault data determination circuit structured to continually determine fault data for a vehicle, a service event start determination circuit structured to determine that a service event for the vehicle has started, a service event end determination circuit structured to determine that the service event for the vehicle has ended, and a fault message interruption circuit structured to interrupt transmission of fault messages during a time period after the service event for the vehicle has started and before the service event for the vehicle has ended.

Another embodiment relates to a method. The method comprises determining fault data for a vehicle continually, determining that a service event for the vehicle has started, interrupting transmission of fault message during a time period after the service event for the vehicle has started and before the service event for the vehicle has ended, and determining that the service event for the vehicle has ended.

Yet another embodiment relates to a system. The system comprises a controller structured to determine fault data for a vehicle continually, determine that a service event for the vehicle has started, interrupt transmission of fault message during a time period after the service event for the vehicle has started and before the service event for the vehicle has ended, and determine that the service event for the vehicle has ended.

These and other features, together with the organization and manner of operation thereof, will become apparent from the following detailed description when taken in conjunction with the accompanying drawings.

DETAILED DESCRIPTION

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended, any alterations and further modifications in the illustrated embodiments, and any further applications of the principles of the disclosure as illustrated therein as would normally occur to one skilled in the art to which the disclosure relates are contemplated herein.

Referring to the Figures generally, the various embodiments disclosed herein relate to systems and methods for tailoring responses of a telematics system to fault information during service events. Telematics systems can be used in vehicular applications for wirelessly providing onboard fault information, diagnosing faults, and notifying customers of the faults through email, text message, etc. Sometimes, however, customers might not want to be alerted of all the faults diagnosed. For example, during a service event for a vehicle that happen at customer service sites, OEM service sites, dealer sites, distributor sites, repair shops, etc., faults ensue from various service procedures performed on the vehicle. During troubleshooting procedures, wires might be shorted high or shorted low, which would generate wiring faults; some part of the wiring harness might be disconnected with the key on, which would generate datalink-related faults. Reporting these faults generated during the service event may distract the customer from "real" faults outside of the service event. In the method disclosed herein, the start and end of a service event are determined. Transmission of fault message to the customer is interrupted during the time period after the service event has started and before the service event has ended. In particular, fault messages generated during the service event are tagged, which are not reported to the customer, while untagged fault messages, i.e., fault messages generated outside of the service event, may be reported to the customer. The start of the service event can be determined based on detecting activities of an off-board diagnostic service tool or combination of parameters. The end of the service can be determined based on engine speed, vehicle speed, GPS distance, or combination of parameters.

Figure 1:
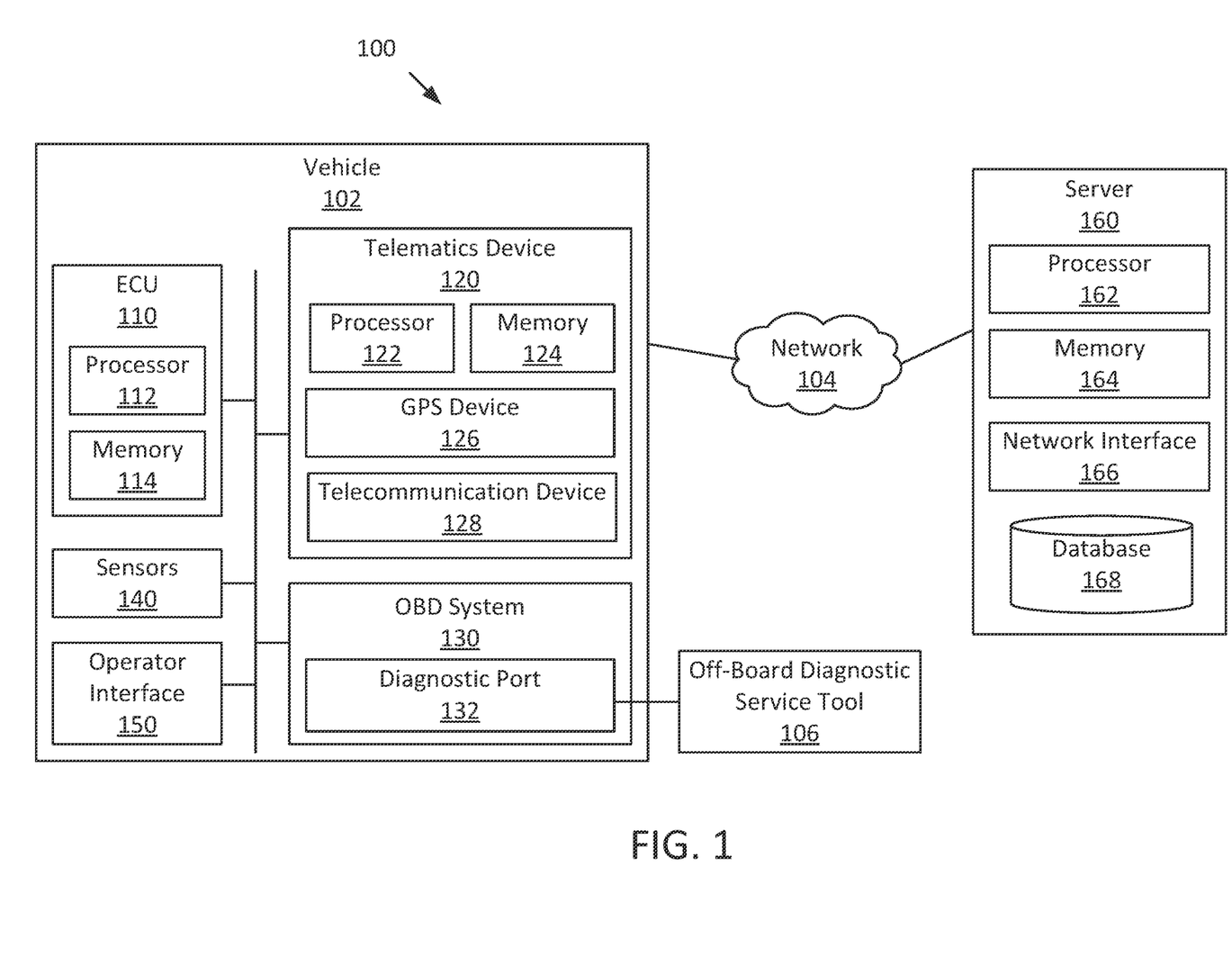
FIG. 1 is a schematic diagram of a telematics system in a service event, according to an example embodiment.

Referring now to FIG. 1, a schematic diagram of a telematics system in a service event is shown, according to an example embodiment. The telematics system 100 facilitates communications between a vehicle 102 and a server 160 via a network 104. The vehicle 102 may be in a service procedure and connected to an off-board diagnostic service tool 106 at, for example, a customer service site, an OEM service site, a dealer site, a distributor site, or a repair shop.

The vehicle 102 may be any type of passenger or commercial automobile, such as a car, truck, sport utility vehicle, cross-over vehicle, van, minivan, automobile, tractor. Moreover, the vehicle 102 may include other types of vehicles such as a motorcycle, plane, helicopter, locomotive, or railway car. The vehicle 102 may generally include a fuel tank, engine, powertrain system, and wheels (not shown in the present figure). The vehicle 102 is shown to include an electronic control unit (ECU) 110, a telematics device 120, an on-board diagnostic (OBD) system 130, sensors 140, and an operator interface 150. Components of the vehicle 102 may communicate with each other via any number of wired or wireless connections. For example, a wired connection may include a serial cable, a fiber optic cable, a CAT5 cable, or any other form of wired connection. In comparison, a wireless connection may include the Bluetooth, Wi-Fi, cellular, radio, etc. In one embodiment, components of the vehicle 102 are connected to a vehicle network such as a control area network (CAN) or a manufacturer proprietary network. Each of the components is structured to transmit and/or receive data (e.g., instructions, commands, signals, values, etc.) to/from one or more of other components shown in FIG. 1.

The ECU 110 includes a processor 112 and a memory 114. The memory 114 stores various instructions that, when executed by the processor 112, control the operation of various components and/or subsystems of the vehicle 102. For example, the ECU 110 may include an electronic fuel injection control unit, engine mobilizer control unit, aftertreatment system control unit, etc. The processor 112 may be implemented as a general-purpose processor, an application specific integrated circuit (ASIC), one or more field programmable gate arrays (FPGAs), a digital signal processor (DSP), a group of processing components, or other suitable electronic processing components. The memory 114 may include one or more tangible, non-transient volatile memory or non-volatile memory, e.g., NVRAM, RAM, ROM, Flash Memory, hard disk storage, etc.). Moreover, the memory 114 may include database components, object code components, script components, or any other type of information structure.

The OBD system 130 may be structured to diagnose the performance of the components and subsystems of the vehicle 102, such as ECU, ABS system, heating/air conditioning system, brake system, transmission system, and so on. Sensors 140 are positioned throughout the vehicle 102 to monitor the operational status and condition of a wide range of components and subsystems of the vehicle 102. For example, sensors 140 can measure engine temperature/speed/load, battery voltage, aftertreatment system emission, tire pressure, fuel tank level, etc. The OBD system 130 may receive data indicative of operational status and conditions of the components and subsystems monitored by the sensors 140. Based on the data, the OBD system 130 diagnoses malfunctions or deterioration in performance of the components and subsystems. In one example, if a monitored parameter falls outside of a normal range of operation, the OBD system 130 may generate a fault code indicative of the abnormal parameter. For instance, if the engine coolant level falls outside of a predefined normal operating range, the OBD system 130 will issue a fault code indicating that the engine coolant level is low. In another example, if a subsystem or component fails or is unable to send its output due to an open or short-circuit, the OBD system 130 may generate a fault code indicative of the failure to read the parameter. For instance, wires may be shorted high or shorted low, which would generate wiring faults; some part of the wiring harness might be disconnected with the key on, which would generate datalink-related faults; and so on. In further embodiments, the fault code generated is stored in the memory 114. It should be noted that different manufactures may have different fault code systems.

The OBD system 130 may indicate the diagnosed fault at the operator interface 150 of the vehicle 102. The operator interface 150 enables an operator of the vehicle 102 to read status and conditions of the vehicle 102. For example, the operator interface 150 may include, but is not limited to, an interactive display (e.g., a touchscreen, etc.), a dashboard, a control panel, etc. The operator interface 150 may display the fault information reported by the OBD system 130 for the operator to read. For example, the check engine light on the dashboard may be turned on when the OBD system 130 diagnoses a fault of the engine. The tire air pressure light may be turned on when the OBD system 130 determines the tire air pressure is outside of the normal operational range, and so on.

The OBD system 130 includes a diagnostic port 132 through which an off-board service tool 106 can access the OBD system 130. The off-board service tool 106 may be used at a service site, which may be an OEM handheld scan tool/code reader or a computing device (e.g., smartphone, laptop) installed with the off-board diagnostic software (e.g., Cummins Insite®). The diagnostic port 132 is a hardware interface, such as a 16-pin serial port, a D-shaped serial port disposed, for example, underneath the dashboard of the vehicle 102. In some embodiments in which the vehicle 102 is a truck, the diagnostic port 132 may be a 6 or 9-pin serial port disposed in the truck's interior. Communication between the OBD system 130 and the off-board diagnostic service tool 106 may follow different protocols, for example but not limited to, SAE J1939, J1708/J1587, J1850 VPW, J1850 VPWM, ISO 9141-2, Keyword 2000, and CAN. Besides the fault information (e.g., fault codes), other vehicle conditions and status information such as vehicle identification number (VIN), mileage, engine speed, etc. can also be accessed via the diagnostic port 132. The VIN is unique to each vehicle and includes information about its make, model, year (and month) of production, and serial number. During a service procedure performed on the vehicle 102, the off-board diagnostic service tool 106 is plugged into the diagnostic port 132 for reading the fault information generated by the OBD system 130.

The telematics device 120 may be structured to provide the fault information obtained onboard to a remote server 160 for further processing via the network 104. In some embodiments, the telematics device 120 is an OEM device embedded in the vehicle 102. In other embodiments, the telematics device 120 is an aftermarket standalone device, e.g., a telematics box. The standalone telematics box may be coupled to the vehicle through the diagnostic port 132. When the diagnostic service tool 106 is to use the diagnostic port 132, the telematics box can be disconnected from the vehicle 102. The telematics box can later read the fault information generated when it is disconnected from, for example, the memory 114 of the ECU 110. The embedded OEM telematics device may not need to use the diagnostic port 132 for communicating with the OBD system 130 and/or the ECU 110. The telematics device 120 may obtain the raw data acquired by the sensors 140 and/or the fault information determined by the OBD system 130. In some embodiments, the telematics device 120 may integrate certain telecommunication functions. For example, a navigation system within the vehicle 102 may be included in the telematics device 120.

The telematics device 120 includes a processor 122, a memory 124, a GPS device 126, and a telecommunication device 128. The memory 124 stores various instructions that, when executed by the processor 122, control the operation of the telematics device 120. The GPS device 126 may track the location of the vehicle 102 (e.g., latitude and longitude data, elevation data, etc.) and store the tracked data in the memory 124. The memory 124 may further store the diagnostic data of the vehicle 102. The telecommunication device 128 may transmit the GPS data and the diagnostic data of the vehicle 102 to the remote telematics server 160 and receive data from the telematics server 160 over the network 104. Although not shown in FIG. 1, the telecommunication device 128 may include an antenna, a radio frequency (RF) transceiver, and a subscriber identity module (SIM). The telecommunication device 128 may follow any type of mobile communications protocol, for example but not limited to, cellular, satellite, radio, Wi-Fi, WiMax, Bluetooth, Zigbee, GSM, GPRS, LTE, and the like.

The server 160 may be structured to receive fault information and location positioning information of the vehicle 102 from the telematics device 120, store and analyze the information received, and notify the customer of the faults through email, text message, etc. For example, at the moment an engine system fault occurs, the telematics device 120 may instantly transmit key engine system and GPS data to the telematics server 160. The server 160 may immediately analyze the data and provide actionable information to the operator, e.g., provide the fault information and even a location of a service site at the operator interface 150 and/or through email, text message or mobile application. In further embodiments, the server 160 may provide fault information to an operator of a fleet. In some embodiments, the server 160 is implemented as a central computing system hosted by a vehicle manufacturer, a telematics provider, an OEM, or another party. In some embodiments, the server 160 is implemented as a cloud network including multiple computing systems, which can share and transfer vehicle information and data store, and coordinate to process the received data.

The server 160 includes a processor 162, a memory 164, a network interface 166, and a database 168. The memory 164 stores various instructions that, when executed by the processor 162, control the operation of the telematics server 160. In some embodiments, the memory 164 stores diagnostic applications that can identify fault code number, description of the fault, causal parts of the fault, etc., and generate and send alarms, fault reporting, or other equipment management related information to the customer. The network interface 166 allows the server 160 to send and receive data to and from external devices (e.g., telematics device 120) via the network 104. The database 168 is structured to receive and store, hold, and otherwise serve as a repository for fault information and other vehicle-related data received from the telematics device 120. In some embodiments, the database 168 may be a separate component relative to the telematics server 160. For example, due to the potential high volume or quantity of data stored by the database 168, the database 168 may be formed or constructed from two or more server-based storage components stored over two or more remote geographic locations.

In some embodiments, the database 168 may also include one or more classification and/or categorization functions (e.g., logic processing, etc.). The classification function may sort, categorize, or otherwise classify each piece of received data from vehicles according to, for example, the vehicle identification number (VIN) of each vehicle, or any other suitable identifier. Upon any fault transmission between the vehicle 102 and server 160, the fault data may be stored in the database 168 under the VIN of the vehicle 102. In some embodiments, the database 168 may store product recalls, historical problem history, and related known current problems of the vehicle 102 under the VIN. The database 168 may create a user profile for the vehicle 102, which identifies past problems, previous services performed, expected maintenance checkups, any product recalls based on the make and model of the vehicle 102, and vehicle information such as mileage and updated or customized vehicle parts. In further embodiments, the user profile may also include user information including the customer's name, contact information, and preferences, such as a preference to receive notifications via email rather than display on the operator interface 150 of the vehicle 102. In some embodiments, the processor 162 may analyze or examine received fault data in conjunction with accessing the user profile stored in the database 168 to create an analysis report. The analysis report may indicate the underlying problem with the fault, severity of the fault (e.g., whether immediate action is necessary), etc. The processor 162 may further provide the analysis report to the user in reference to the preferences of the user indicated in the user profile.

The network 104 facilitates communication between the vehicle 102 and the server 160. The network 104 may include private networks, public networks, or a combination thereof. In some embodiments, the network 104 includes the Internet. Since the telematics device 120 uses a wireless communication protocol, the network 104 may be a wireless network or a combination of wireless and wired networks. The wireless network may be any type of wireless network, for example, a satellite or cellular network using protocols such as Global System for Mobile Communications (GSM), Code Division Multiple Access (CDMA), General Packet Radio Service (GPRS), Long Term Evolution (LTE), High Rate Packet Data (HRPD), Wi-Fi, Personal Communications Service (PCS), etc. The wired network may be any type of wired network, for example, Ethernet network, Local Talk, Fiber Distributed Data Interface (FDDI), etc.

Figure 2:
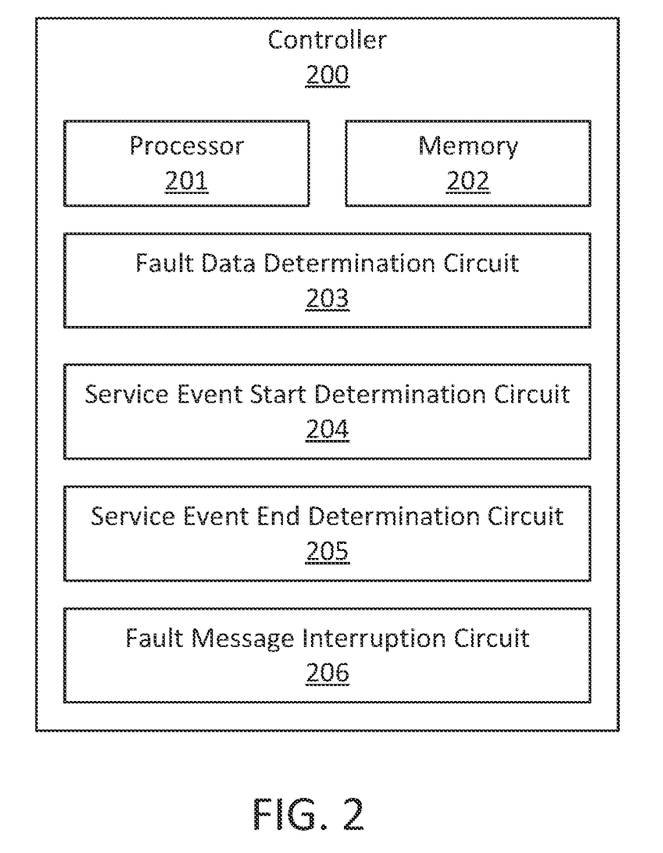
FIG. 2 is a schematic diagram of a controller that can be used in the telematics system of FIG. 1, according to an example embodiment.

Referring now to FIG. 2, a schematic diagram of a controller that can be used in the telematics system of FIG. 1 is shown, according to an example embodiment. The controller 200 may be implemented on the ECU 110, the telematics device 120, or the server 160 for tailoring responses of the telematics system 100 to fault information diagnosed during a service event. The controller 200 is shown to include a processor 201 and a memory 202. The processor 201 may be implemented as any type of processor including an application specific integrated circuit (ASIC), one or more field programmable gate arrays (FPGAs), a digital signal processor (DSP), a group of processing components, or other suitable electronic processing components. The processor 201 can be the processor of the component that hosts the controller 200 (i.e., processor 112, processor 122, or processor 162), or a separate processor. The memory 202 may include one or more tangible, non-transient volatile memory or non-volatile memory, e.g., NVRAM, RAM, ROM, Flash Memory, hard disk storage, etc.). Moreover, the memory 202 may include database components, object code components, script components, or any other type of information structure. The memory 202 may store data and/or computer code for facilitating the various processes described herein. The memory 202 can be the memory of the component that hosts the controller 200 (memory 114, memory 124, or memory 164), or a separate memory.

The controller 200 includes various circuits for completing the activities described herein. In one embodiment, the circuits of the controller 200 may utilize the processor 201 and/or memory 202 to accomplish, perform, or otherwise implement various actions described herein with respect to each particular circuit. In this embodiment, the processor 201 and/or memory 202 may be considered to be shared components across each circuit. In another embodiment, the circuits (or at least one of the circuits) may include their own dedicated processing circuit having a processor and a memory device. In this latter embodiment, the circuit may be structured as an integrated circuit or an otherwise integrated processing component. In yet another embodiment, the activities and functionalities of circuits may be embodied in the memory 202, or combined in multiple circuits, or as a single circuit. In this regard and while various circuits with particular functionality are shown in FIG. 2, it should be understood that the controller 200 may include any number of circuits for completing the functions and activities described herein. For example, the activities of multiple circuits may be combined as a single circuit, as an additional circuit(s) with additional functionality, etc. Further, it should be understood that the controller 200 may further control other activity beyond the scope of the present disclosure.

Certain operations of the controller 200 described herein include operations to interpret and/or to determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

The controller 200 includes a fault data determination circuit 203, a service event start determination circuit 204, a service event end determination circuit 205, and a fault message interruption circuit 206. Through the circuits 203-206, the controller 200 is structured to determine fault data for the vehicle 102 continually, determine that a service event of the vehicle has started, interrupt transmission of fault messages during the service event, and determine that the service event of the vehicle has ended.

The fault data determination circuit 203 is structured to determine fault data for the vehicle 102 continually. The vehicle 102 includes many components and subsystems, which need to function properly and communicate smoothly to ensure a safe driving experience. Failures and faults of the components and subsystems may affect the operation of the vehicle 102. In addition, emission of the vehicle 102 may need to be monitored to conform to emission regulations. As discussed above in reference to FIG. 1, the vehicle 102 includes the sensors 140 positioned throughout the vehicle 102 that monitor a wide range of subsystems and components and generate various operational parameters of the vehicle 102, such as engine temperature, battery voltage, fluid flow rate, oil temperature and pressure, emission control function, cylinder head temperature, vehicle speed, engine speed, engine load, mass air flow, etc. In some embodiments in which the controller 200 is implemented on the ECU 110, the fault data determination circuit 203 may use the OBD system 130, which receives data indicative of operational status and conditions of the components and subsystems from the sensors 140 and diagnose malfunctions or deterioration in performance. In some embodiments in which the controller 200 is implemented on the telematics device 120, the fault data determination circuit 203 may use data that the telematics device 120 has obtained from the ECU 110 and/or the OBD system 130 and stored in the memory 124. The data may include the raw data acquired by the sensors 140 and/or the fault information determined by the OBD system 130. In some embodiments in which the controller 200 is implemented on the telematics server 160, the fault data determination circuit 203 may use data that the telematics server 160 has received form the telematics device 120 and stored in the memory 164. In further embodiments, the fault data determination circuit 230 may analyze or examine received data in conjunction with accessing the user profile stored in the database 168 to determine the fault data. Fault data can be generated when a monitored parameter falls outside of a normal range of operation, a component fails or is unable to send its output due to an open or short-circuit. The fault data determination circuit 203 may analyze each situation and generate corresponding fault data (e.g., a diagnostic trouble code, or DTC) indicative of the abnormal condition. In some embodiments, the fault data determination circuit 203 may also generate alarms, fault reporting, or other equipment management related information.

The service event start determination circuit 204 is structured to determine the start of a service event. The service event may take place at a service center that provides vehicle repairs and services, such as a customer service site, an OEM service site, a dealer site, a distributor site, or a repair shop. In some embodiments, the service event start determination circuit 204 determines that the service event has started in response to detecting activities of an off-board diagnostic service tool (e.g., off-board diagnostic service tool 106 of FIG. 1). The off-board diagnostic service tool 106 may be connected to the vehicle 102 at the beginning of and possibly during a service event to read fault data and other vehicle related data. In some embodiments, the off-board diagnostic service tool 106 is an OEM handheld scan tool or code reader. In some embodiments, the off-board diagnostic service tool 106 is a computing device (e.g., laptop) installed with the off-board diagnostic software (e.g., Cummins Insite®). The off-board diagnostic service tool 106 may be plugged into the diagnostic port 132 in order to access the OBD system 130 of the vehicle 102. In some embodiments, the diagnostic port 132 may be a serial communication port, such as a 6, 9, or 16-pin serial port, a D-shaped serial port, etc. In some embodiments in which the telematics device 120 is an aftermarket standalone device that is coupled to the vehicle 102 using the diagnostic port 132, the telematics device 120 may be disconnected from the diagnostic port 132 when the off-board diagnostic service tool 106 is to be plugged.

Figure 4:
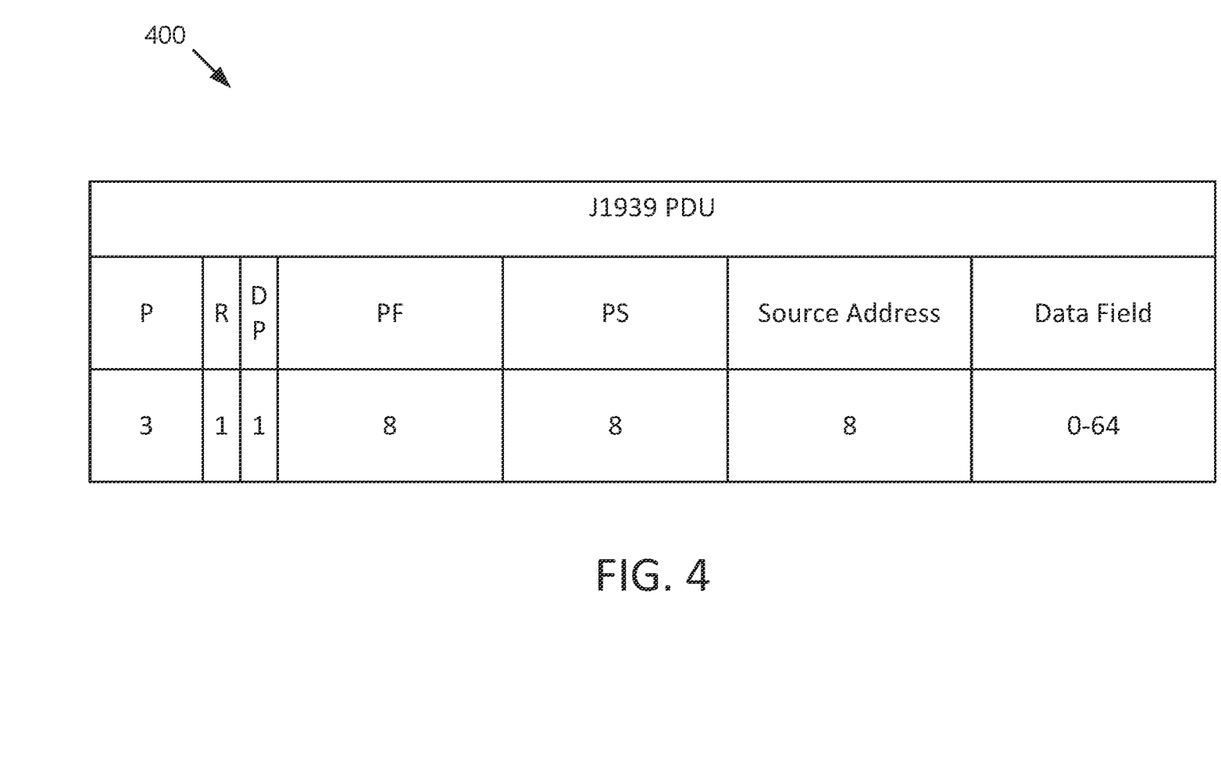
FIG. 4 is a schematic diagram of a J1939 protocol data unit, according to an example embodiment.

In some embodiments, activities of the off-board diagnostic service tool 106 may be detected by receiving packets with a source address reserved for off-board diagnostic service tools. The off-board diagnostic service tool 106 and the OBD system 130 may communicate following protocols, such as SAE J1939, J1708/J1587, J1850 VPW, J1850 VPWM, ISO 9141-2, Keyword 2000, and CAN. SAE J1939 is taken as an example for explanation herein. It shall be understood that the method disclosed herein may be applied/adapted for any other suitable communication protocols. FIG. 4 shows a schematic diagram of a J1939 protocol data unit (PDU), according to an example embodiment. The PDU 400 provides a framework for organizing the communication at the data link layer. The PDU 400 has seven fields. The three-bit priority field (P) may identify the priority of the message for transmission. The one-bit reserved field (R) is always 0. The one-bit data page (DP) field only uses 0. The eight-bit PDU format (PF) field may identify the format of the PDU. The eight-bit PDU specific (PS) field may identify either the destination address to which the message is being sent or the group extension value, depending on the PDU format. The eight-bit source address (SA) may identify the address from which the message is being transmitted. The data field may contain up to 8 bytes of data. Two given source addresses are reserved for off-board diagnostic service tools. In particular, source address 249 is reserved for the first off-board diagnostic service tool, which may only be used for the name function of 129, industry group 0, function instance 0, and an ECU instance of 0. Source address 250 is reserved for the second off-board diagnostic service tool, which may only be for the name function 129, industry group 0, function instance 1, and an ECU instance of 0.

In some embodiments in which the controller 200 is implemented on the ECU 110, the service event start determination circuit 204 may determine that a service event has started in response to detecting that packets received at the diagnostic port 132 have a source address reserved for the off-board diagnostic service tool 106. In some embodiments in which the controller 200 is implemented on the telematics device 120, the service event start determination circuit 204 may use data obtained from the OBD system 130 and/or the ECU 110, which indicates that the diagnostic port 132 is in use by the off-board diagnostic service tool 106. In further embodiments in which the telematics device 120 is an aftermarket standalone device that is disconnected from the diagnostic port 132 when the off-board diagnostic service tool 150 is to be plugged, the service event start determination circuit 204 may later read the data when the telematics device 120 is reconnected to the vehicle 102. The memory 124 may store the data generated when the off-board diagnostic service tool 106 is connected. In some embodiments in which the controller 200 is implemented on the telematics server 160, the service event start determination circuit 204 may use data received from the telematics device 120, which indicates that the diagnostic port 132 is in use by the off-board diagnostic service tool 106.

The service event end determination circuit 205 is structured to determine the end of a service event. The end of the service can be determined based on various parameters and/or combination of parameters. In some embodiments, the service event end determination circuit 205 determines that the service event is over if the engine speed of the vehicle 102 exceeds a predetermined engine speed threshold. In further embodiments, the service event is determined to have ended if the engine speed exceeds the predetermined threshold for a predetermined amount of time (e.g., 10 minutes) because the engine is unlikely to revolve continually for 10 minutes during a service event. In some embodiments, the service event end determination circuit 205 determines that the service event is over if the vehicle speed exceeds a predetermined vehicle speed threshold. In further embodiments, the service event is determined to have ended if the vehicle speed exceeds the predetermined threshold (e.g., 35 miles/hour) for a predetermined amount of time (e.g., 10 minutes) because the vehicle is unlikely to move at the speed of 35 miles/hour for 10 minutes during a service event. In some embodiments, the service event end determination circuit 205 determines that the service event is over if the distance of the vehicle to the service center exceeds a predetermined distance threshold (e.g., 20 miles) because the vehicle is unlikely to be so far from the service center during a service event. The distance may be tracked by the GPS device 126, for example. In some embodiments, the service event end determination circuit 205 determines that the service event is over if the engine load of the vehicle exceeds a predetermined engine load threshold. In some embodiments, the service event end determination circuit 205 determines that the service event is over if more than one of the parameters exceed their corresponding thresholds. It shall be understood that the approaches described herein are for illustration not for limitation, any other suitable approach may be employed to determine the end of the service event.

In some embodiments in which the controller 200 is implemented on the ECU 110, the service event end determination circuit 205 may use the parameters monitored by the sensors 140. In some embodiments in which the controller 200 is implemented on the telematics device 120, the service event end determination circuit 205 may use data received from the ECU 110 and/or data from the OBD system 130. In some embodiments in which the controller 200 is implemented on the telematics server 160, the service event end determination circuit 205 may use data transmitted from the telematics device 120.

The fault message interruption circuit 206 is structured to interrupt transmission of fault message during a time period after the service event for the vehicle has started and before the service event has ended. As discussed above in reference to FIG. 1, the telematics server 160 may store the fault data and notify the customer of the fault through email, text message, mobile application, etc. Sometimes, however, customers might not want to be alerted of all the faults diagnosed. During a service event, some faults may be intentionally caused in the service procedure for the purpose of testing and troubleshooting. For example, wires might be shorted high or shorted low, which would generate wiring faults; some part of the wiring harness might be disconnected with the key on, which would generate datalink-related faults. Reporting these faults generated during the service event may distract the customer from "real" faults. Thus, if the fault data is generated during the service event, the fault data is still stored in the database 168, but no fault message is sent to the customer. In some embodiments, the customer may be the operator of the vehicle. In some embodiments, the customer may be the operator of a fleet as opposed to the operator of the vehicle.

The fault message interruption circuit 206 may set a "service event" flag for fault data generated during the service event, i.e., after the service event has started and before the service event has ended. In some embodiments in which the controller 200 is implemented on the ECU 110, the service event flag is saved with the fault data as an ECU parameter. The telematics device 120 reads the fault data with the service event flag and relays the data along with the flag to the telematics server 160. The telematics server 160, upon reading the service event flag, stores the fault data with the service event flag in the database 168, but does not transmit fault messages to the costumer. In some embodiments in which the controller 200 is implemented on the telematics device 120, the service event flag is set at the telematics device 120. In some embodiments in which the controller is implemented on the telematics server 160, the service event flag is set at the telematics server 160.

Figure 3:
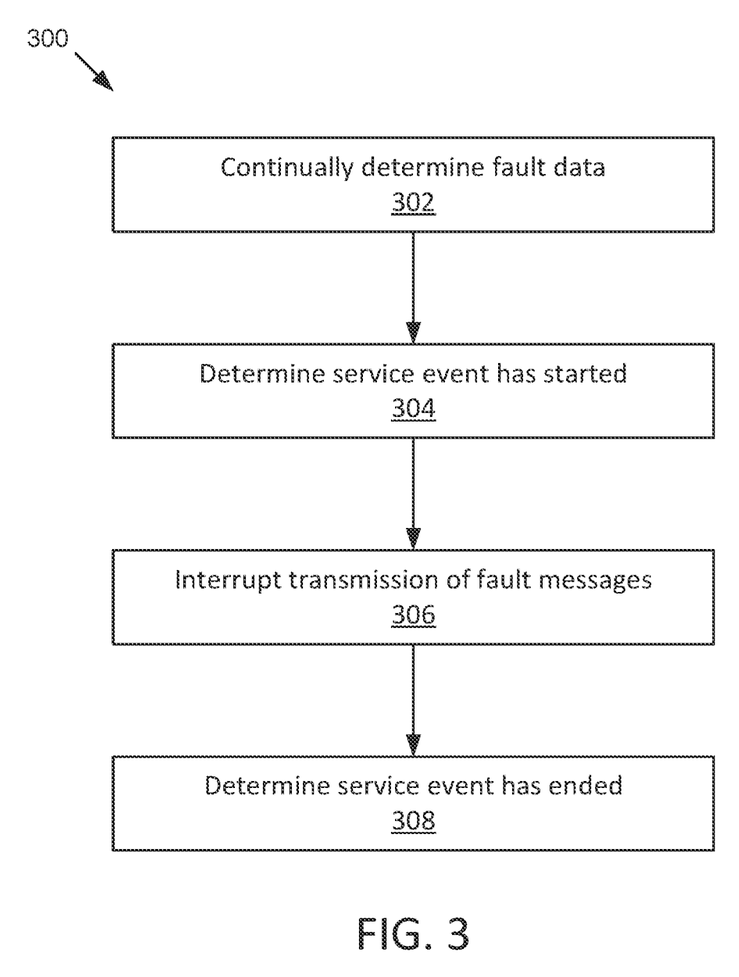
FIG. 3 is a flow diagram of a method of tailoring the response of a telematics system to fault data, according to an example embodiment.

Referring now to FIG. 3, a flow diagram of a method of tailoring response to fault data generated during a service event is shown according to one embodiment. The method 300 may be executed by the controller 200 implemented on the ECU 110, the telematics device 120, or the telematics server 160.

At process 301, fault data is continually determined for the vehicle 102. In some embodiments, the fault data is determined by diagnosing operational parameters monitored by the sensors 140 positioned throughout the vehicle 102. The operational parameters may include engine temperature, battery voltage, fluid flow rate, oil temperature and pressure, emission control function, cylinder head temperature, vehicle speed, engine speed, engine load, mass air flow, etc. In some embodiments, the fault data is determined by accessing fault data identified by the OBD system 130. In some embodiments, the fault data is determined by analyzing fault data transmitted from the onboard telematics device 120. Fault data can be generated when a monitored parameter falls outside of a normal range of operation, a component fails or is unable to send its output due to an open or short-circuit. In some embodiments, the fault data (e.g., fault codes) is generated to indicate the abnormal condition. In some embodiments, the fault data may include alarms, fault reporting, or other equipment management related information.

At process 304, a service event is determined to have started. The service event may take place at a service center that provides vehicle repairs and services, such as a customer service site, an OEM service site, a dealer site, a distributor site, or a repair shop. In some embodiments, the service event may be determined to start in response to detecting activities of an off-board diagnostic service tool (e.g., off-board diagnostic service tool 106 of FIG. 1). The off-board diagnostic service tool 106 may be plugged into the diagnostic port 132 in order to access the OBD system 130 and/or the ECU 110 of the vehicle 102. Communication between the off-board diagnostic service tool 106 and the OBD system 130 may follow protocols, such as SAE J1939, J1708/J1587, J1850 VPW, J1850 VPWM, ISO 9141-2, Keyword 2000, and CAN. For example, in the protocol SAE J1939, two source addresses, 249 and 250, in the protocol data unit (PDU) are reserved for off-board diagnostic service tools. When packets with a source address reserved for off-board diagnostic service tools is received at the diagnostic port 132, a service event is determined to have started. It should be understood that the method disclosed herein may be applied/adapted for any other suitable communication protocols.

At process 306, transmission of fault messages is interrupted during the service event. In some embodiments, a "service event" flag is set for fault data generated during the service event. In some embodiments, the service event flag is set by the ECU 110 and saved with the fault data as an ECU parameter. The telematics device 120 reads the fault data with the service event flag and relays the data along with the flag to the telematics server 160. The telematics server 160, upon reading the service event flag, stores the fault data with the service event flag in the database 168, but does not transmit fault messages to the costumer. In some embodiments, the service event flag is set by the telematics device 120. In some embodiments, the service event flag is set by the telematics server 160.

At process 308, the service event is determined to have ended. The end of the service can be determined based on various parameters and/or combination of parameters. In some embodiments, the service event is determined to have ended if the engine speed of the vehicle 102 exceeds a predetermined engine speed threshold. In further embodiments, the service event is determined to have ended if the engine speed of the vehicle 102 exceeds the threshold for a predetermined amount of time. In some embodiments, the service event is determined to have ended if the vehicle speed exceeds a predetermined vehicle speed threshold. In further embodiments, the service event is determined to have ended if the vehicle speed exceeds the threshold for a predetermined amount of time. In some embodiments, the service event is determined to have ended if the distance of the vehicle to the service center exceeds a predetermined distance threshold. The distance may be tracked by the GPS device 126, for example. In some embodiments, the service event is determined to have ended if the engine load of the vehicle exceeds a predetermined engine load threshold. In some embodiments, the service event is determined to have ended if more than one of the parameters exceed their corresponding thresholds. It shall be understood that the approaches described herein are for illustration not for limitation, any other suitable approach may be employed to determine the end of the service event.

It should be understood that no claim element herein is to be construed under the provisions of 35 U.S.C. § 112(f), unless the element is expressly recited using the phrase "means for." The schematic flow chart diagrams and method schematic diagrams described above are generally set forth as logical flow chart diagrams. As such, the depicted order and labeled steps are indicative of representative embodiments. Other steps, orderings and methods may be conceived that are equivalent in function, logic, or effect to one or more steps, or portions thereof, of the methods illustrated in the schematic diagrams. Further, reference throughout this specification to "one embodiment", "an embodiment", "an example embodiment", or similar language means that a particular feature, structure, or characteristic described in connection with the embodiment is included in at least one embodiment of the present invention. Thus, appearances of the phrases "in one embodiment", "in an embodiment", "in an example embodiment", and similar language throughout this specification may, but do not necessarily, all refer to the same embodiment.

Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Many of the functional units described in this specification have been labeled as circuits, in order to more particularly emphasize their implementation independence. For example, a circuit may be implemented as a hardware circuit comprising custom very-large-scale integration (VLSI) circuits or gate arrays, off-the-shelf semiconductors such as logic chips, transistors, or other discrete components. A circuit may also be implemented in programmable hardware devices such as field programmable gate arrays, programmable array logic, programmable logic devices or the like.

As mentioned above, circuits may also be implemented in machine-readable medium for execution by various types of processors, such as the controller 200 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

The computer readable medium (also referred to herein as machine-readable media or machine-readable content) may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing. As alluded to above, examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An apparatus, comprising:
a service event start determination circuit configured to determine that a service event for a vehicle has started based on an indication from an off-board diagnostic service tool;
a service event end determination circuit configured to determine that the service event for the vehicle has ended based on a vehicle speed of the vehicle exceeding a vehicle speed threshold; and
a fault message interruption circuit configured to:
determine a service event flag during the service event;
store fault data associated with the service event flag without reporting the fault data associated with the service event flag to a customer;
create a fault analysis report to present to the customer based on the stored fault data; and
interrupt transmission of a fault message during a time period after the service event for the vehicle has started and before the service event for the vehicle has ended.

2. The apparatus of claim 1, wherein the fault message interruption circuit is configured to determine the service event flag for fault data generated during the time period after the service event for the vehicle has started and before the service event for the vehicle has ended.

3. The apparatus of claim 1, wherein the indication that the service event has started includes receiving a communication with a source address reserved for the off-board diagnostic service tool.

4. The apparatus of claim 1, wherein the service event end determination circuit is configured to determine that the service event has ended based on at least one of an engine speed, an engine load, or a distance of the vehicle from a location of the service event.

5. A method, comprising:
determining that a service event for a vehicle has started based on an indication from an off-board diagnostic service tool;
interrupting transmission of a fault message after the service event for the vehicle has started;
determining that the service event for the vehicle has ended; and
resuming transmission of a fault message based on the service event for the vehicle ending;
determining a service event flag during the service event;
storing fault data associated with the service event flag without transmitting a notification regarding the service event flag during the service event; and
creating a fault analysis report based on the stored fault data.

6. The method of claim 5, further comprising determining fault data for the vehicle continually.

7. The method of claim 5, wherein the service event is determined to have started in response to receiving a communication with a source address reserved for the off-board diagnostic service tool.

8. The method of claim 5, wherein the service event is determined to have ended based on at least one of an engine speed of the vehicle, an engine load of the vehicle, or a distance of the vehicle from a location of the service event.

9. A system, comprising:
a controller configured to:

determine that a service event for a vehicle has started based on an indication from an off-board diagnostic service tool;

interrupt transmission of a fault message during a time period after the service event for the vehicle has started until determining that the service event for the vehicle has ended, wherein the service event is determined to have ended based on an engine load of the vehicle;

determine fault data for the vehicle;

generate a service event flag during the service event; and store fault data associated with the service event flag for transmission after determining that the service event has ended.

10. The system of claim 9, wherein the controller is further configured to determine fault data for the vehicle continually.

11. The system of claim 10, wherein the fault data is determined during the time period after the service event for the vehicle has started until determining that the service event for the vehicle has ended based on operational parameters monitored by sensors of the vehicle.

12. The system of claim 10, wherein the fault data is determined during the time period after the service event for the vehicle has started until determining that the service event for the vehicle has ended based on diagnostic information of an onboard diagnostic system of the vehicle.

13. The system of claim 10, wherein the fault data is determined during the time period after the service event for the vehicle has started until determining that the service event for the vehicle has ended based on current fault information and historical information of the vehicle.

14. The system of claim 9, wherein the service event is determined to have ended based on at least one of an engine speed of the vehicle or a distance of the vehicle from a location of the service event.

\* \* \* \* \*